(12) United States Patent
Gause

(10) Patent No.: US 11,173,591 B2
(45) Date of Patent: Nov. 16, 2021

(54) APPARATUS FOR SERVING VARIOUS PURPOSES

(71) Applicant: Marshall Gause, Thornton, CO (US)

(72) Inventor: Marshall Gause, Thornton, CO (US)

( * ) Notice: Subject to any disclaimer, the term of this patent is extended or adjusted under 35 U.S.C. 154(b) by 0 days.

(21) Appl. No.: 17/230,094

(22) Filed: Apr. 14, 2021

(65) Prior Publication Data
US 2021/0291340 A1    Sep. 23, 2021

Related U.S. Application Data

(60) Provisional application No. 63/010,515, filed on Apr. 15, 2020.

(51) Int. Cl.
| | | |
|---|---|---|
| *B25F 1/02* | (2006.01) | |
| *B26B 11/00* | (2006.01) | |
| *B25F 1/00* | (2006.01) | |

(52) U.S. Cl.
CPC ............... *B25F 1/02* (2013.01); *B25F 1/003* (2013.01); *B25F 1/006* (2013.01); *B26B 11/008* (2013.01)

(58) Field of Classification Search
CPC .. B25F 1/02; B25F 1/003; B25F 1/006; A45C 11/008; A45D 33/26; B26B 11/008
See application file for complete search history.

(56) References Cited

U.S. PATENT DOCUMENTS

| | | | | |
|---|---|---|---|---|
| 2,371,308 A | * | 3/1945 | Mosch | A45C 11/324 70/456 R |
| 2,412,056 A | * | 12/1946 | Mosch | A45C 11/008 70/456 R |
| 2,630,212 A | * | 3/1953 | Mosch | A45D 29/20 132/317 |
| 2,993,586 A | * | 7/1961 | Mosch | F23Q 2/32 206/216 |
| 6,076,665 A | * | 6/2000 | Chuang | A45D 29/20 206/214 |
| 6,145,994 A | * | 11/2000 | Ng | B25F 1/02 206/234 |
| 6,571,940 B2 | * | 6/2003 | Newman | A45C 11/00 206/234 |
| 7,036,174 B2 | * | 5/2006 | Painsith | B26B 11/001 7/118 |
| 7,073,918 B1 | * | 7/2006 | Bauman | B25B 13/56 362/119 |
| 7,146,667 B2 | * | 12/2006 | Elsener | G06K 19/04 7/118 |

(Continued)

*Primary Examiner* — David B. Thomas

(57) ABSTRACT

The present disclosure provides an apparatus for serving one or more purposes. The apparatus includes a case. The case has at least one coupling provision from a plurality of coupling provisions. In addition, the apparatus includes a holder operably coupled at one end of the case. The holder is used for holding at least one of a keychain, a ring, a band, and a bracelet. Further, the apparatus may include a band. The band is placed for holding at least one of a communication device or a hand of a user. Furthermore, the apparatus includes an operating module operable coupled with a mechanism that is positioned inside or around the case to control and operate a holding module. The operating module is positioned on any of face of the case. The holding module has a provision for mounting a plurality of elements for serving the one or more purposes.

10 Claims, 9 Drawing Sheets

(56) References Cited

U.S. PATENT DOCUMENTS

| | | | | |
|---|---|---|---|---|
| 7,344,023 B2* | 3/2008 | Painsith | | A45D 29/20 |
| | | | | 206/234 |
| 7,609,512 B2* | 10/2009 | Richardson | | G06F 1/1626 |
| | | | | 361/679.41 |
| 7,984,804 B2* | 7/2011 | Lebauer | | A45D 29/18 |
| | | | | 206/320 |
| 8,499,933 B2* | 8/2013 | Ziemba | | B65D 71/00 |
| | | | | 206/320 |
| 8,833,379 B1* | 9/2014 | Kaplan | | A45D 33/26 |
| | | | | 132/287 |
| 9,004,333 B2* | 4/2015 | Monaco | | A45C 13/001 |
| | | | | 224/576 |
| 9,545,549 B2* | 1/2017 | Soracco | | A63B 71/0619 |
| 9,585,449 B2* | 3/2017 | Harris | | A45C 11/00 |
| D897,183 S * | 9/2020 | Hancock | | B25F 1/003 |
| | | | | D8/105 |
| 2015/0198974 A1* | 7/2015 | Hill | | G06F 1/1684 |
| | | | | 707/754 |
| 2017/0264331 A1* | 9/2017 | Li | | H04B 1/3888 |
| 2019/0357649 A1* | 11/2019 | Becnel | | A45D 24/10 |
| 2020/0086513 A1* | 3/2020 | Ambielli | | A45C 11/32 |
| 2021/0112935 A1* | 4/2021 | Tran | | A45C 1/06 |

\* cited by examiner

APPARATUS FOR SERVING VARIOUS PURPOSES

TECHNICAL FIELD

The present invention relates to the field of multi-purpose apparatuses, in particular, relates to an apparatus connected with a communication device for serving various purposes.

INTRODUCTION

It has become common in the past few years for users to use cell phones. Today's cell phones are becoming increasingly technically complex and often include components and applications that allow users to perform tasks other than simple voice communication with other users. These days, users often attach accessories with their cell phone, which enables the cell phone to temporarily attach to multiple external equipment, such as, key holder, spinning accessory, protective covers or cases. Only one external equipment can be installed and/or carry once at a time which makes it difficult to use and/or carry the multiple external equipment at once. For example, accessory of the cell phone can attach or carry only one type of screwdriver, such as, Phillips, Flat/Slotted, Hex Key, Torx, Robertson, but it is difficult to attach or carry two or more types of screwdriver at once. In another example, it difficult to attach or carry screwdriver along with bottle opener to the accessory of the cell phone. In yet another example, it is difficult to attach or carry screwdriver along with bottle opener and pen to the accessory of the cell phone. Also, current accessory of the cell phone does not have the provision or equipment to open the door without touching the surface of door handle with hands.

In light of the foregoing discussion, there exists a need for a new and improved accessory which overcomes the above-cited drawbacks.

SUMMARY

In an aspect, the present disclosure provides an apparatus for serving one or more purposes. The apparatus includes a case. The case has at least one coupling provision from a plurality of coupling provisions. The case is made of a first material. In addition, the apparatus includes a holder operably coupled at one end of the case. The holder is used for holding at least one of a keychain, a ring, a band, and a bracelet. The holder is made of a second material. Further, the apparatus includes a band operably connected with the case. The band is placed for holding at least one of a communication device or a hand of a user. The band is made of a third material. Furthermore, the apparatus includes an operating module operably coupled with a mechanism that is positioned inside or around the case to control and operate a holding module. The operating module is positioned on any of face of the case. The holding module has a provision for mounting a plurality of elements for serving the one or more purposes. Moreover, the one or more purposes include contact less door opening, bottle opening, cutting, screwing or unscrewing, writing, torch lightning, disinfectant dispensing and spoke wrenching.

In an embodiment of the present disclosure, the apparatus may include a set of sensors operably coupled with the mechanism of the operating module. The set of sensors enables automatic operation of the mechanism of the operating module. The set of sensors includes one or more image sensors, one or more thermal sensors, one or more proximity sensors, one or more temperature sensors, and one or more microphones.

In an embodiment of the present disclosure, the apparatus may include one or more housings for holding at least one of a credit card, a debit card, a visiting car, a earbud, and a stand or a leaning module for the communication device. The one or more housings are inside or around the case of the apparatus.

In an embodiment of the present disclosure, the plurality of elements includes at least one or combination of a push door opener & a pull door opener, a bottle opener, a cutter, a spoke wrench, a torch, a lighter, a pen, a screw head and a disinfectant dispensing nozzle.

In an embodiment of the present disclosure, the first material is selected from a first group of materials including thermoplastic polyurethane, polycarbonate, acrylonitrile butadiene styrene, polyvinyl chloride, polypropylene, plastic, rubber, metallic materials, alloys, composites, nylon, silicon, and wood.

In an embodiment of the present disclosure, the second material is selected from a second group of materials including acrylonitrile butadiene styrene, canvas, fabric, Leather, plastic, rubber, metallic materials, alloys, composites, nylon, silicon, and wood.

In an embodiment of the present disclosure, the apparatus may include a processor and a memory coupled with the set of sensors. The memory includes instructions configured to cause the processor for automatically serving the one or more purposes. The set of sensors and the processor are located inside or around the base of the apparatus.

In an embodiment of the present disclosure, the operating module controls and operates the holding module using the mechanism that is positioned inside or around the case. The operating module is at least one of a manual operating module, a semi-automatic operating module and an automatic operating module.

In an embodiment of the present disclosure, the plurality of elements is mounted or attached to the holding module automatically or semi-automatically or manually by the user.

BRIEF DESCRIPTION OF THE DRAWINGS

Figure 1:
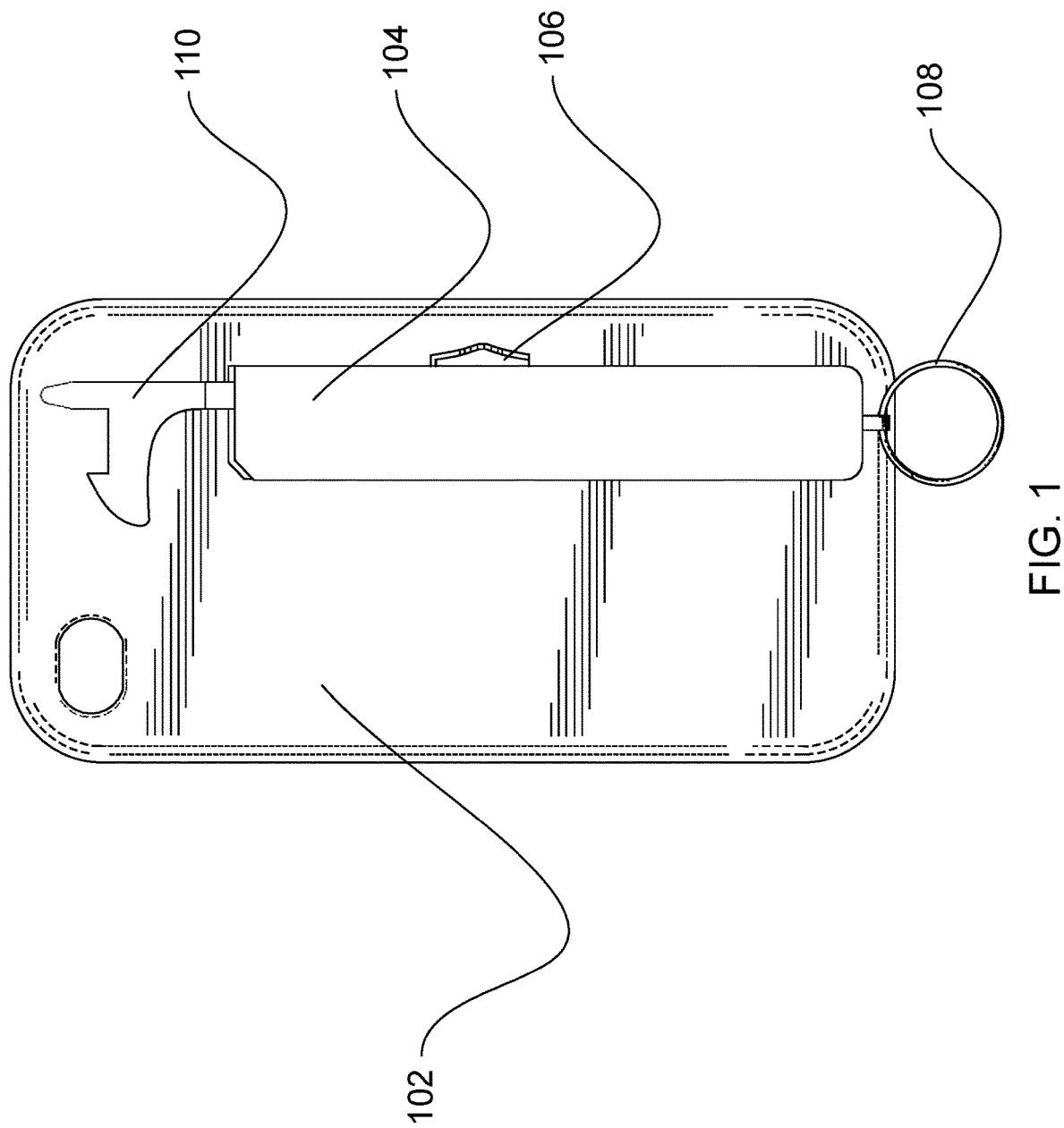
Figure 2:
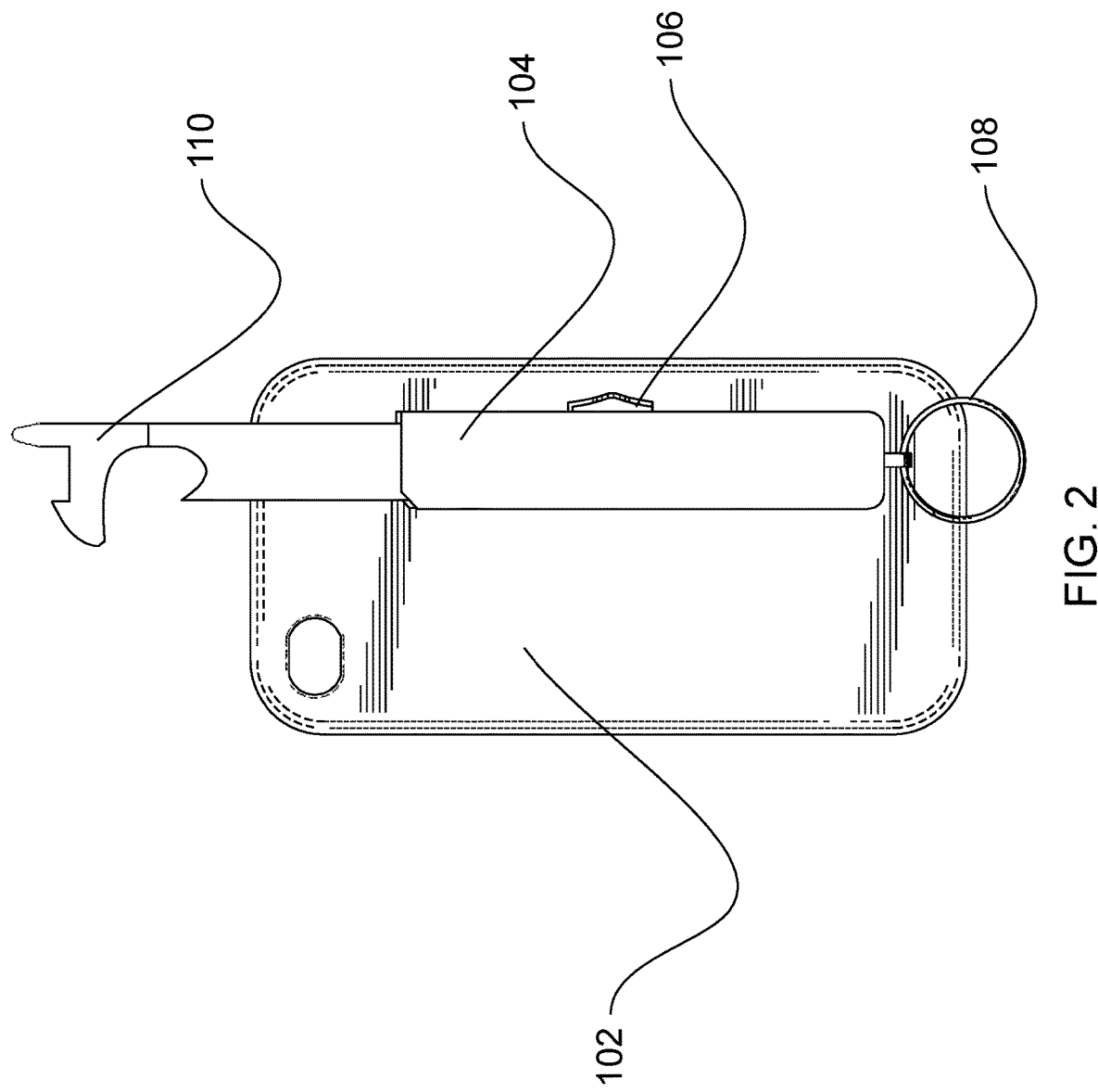
Figure 3:
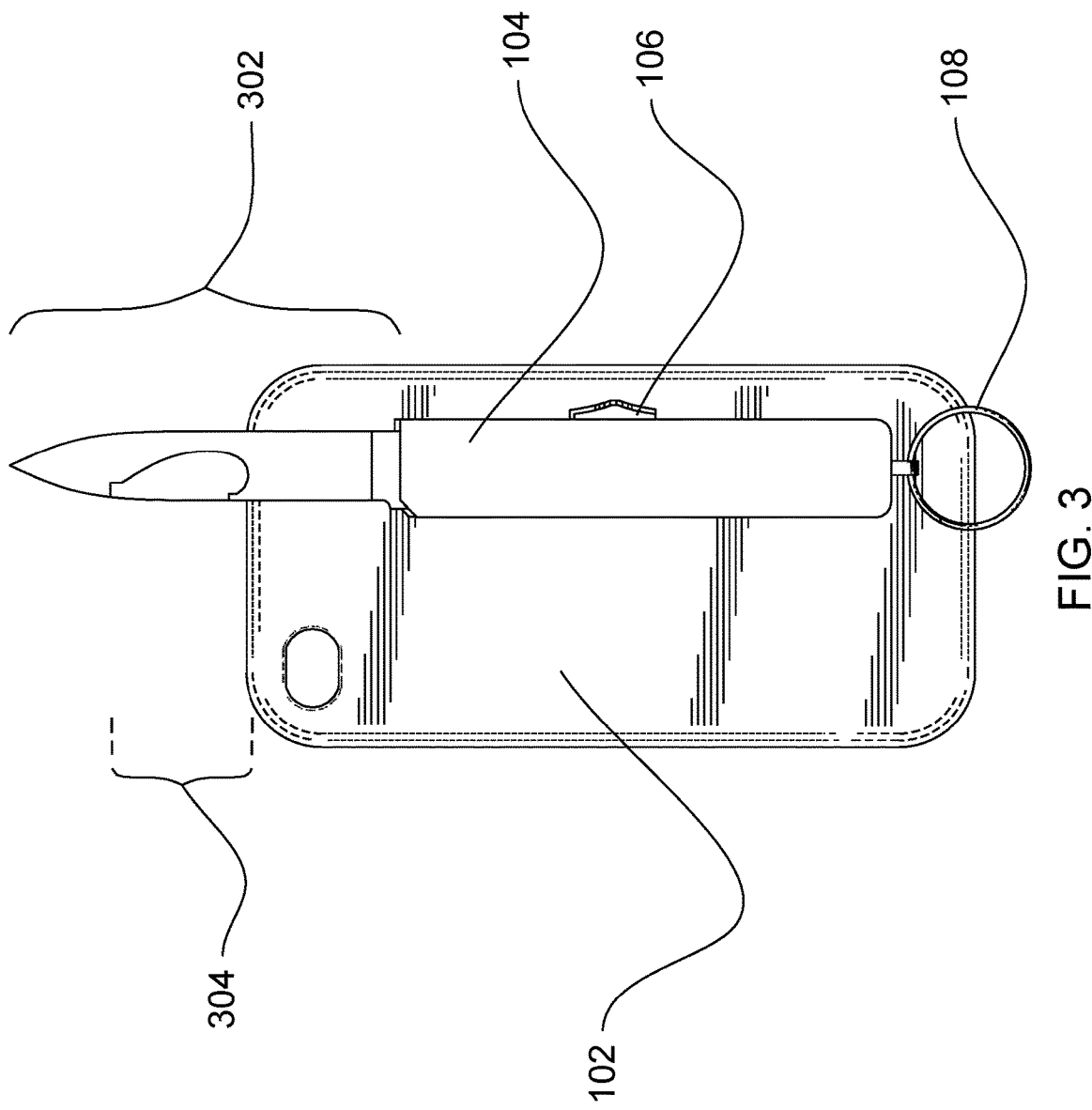
Figure 4:
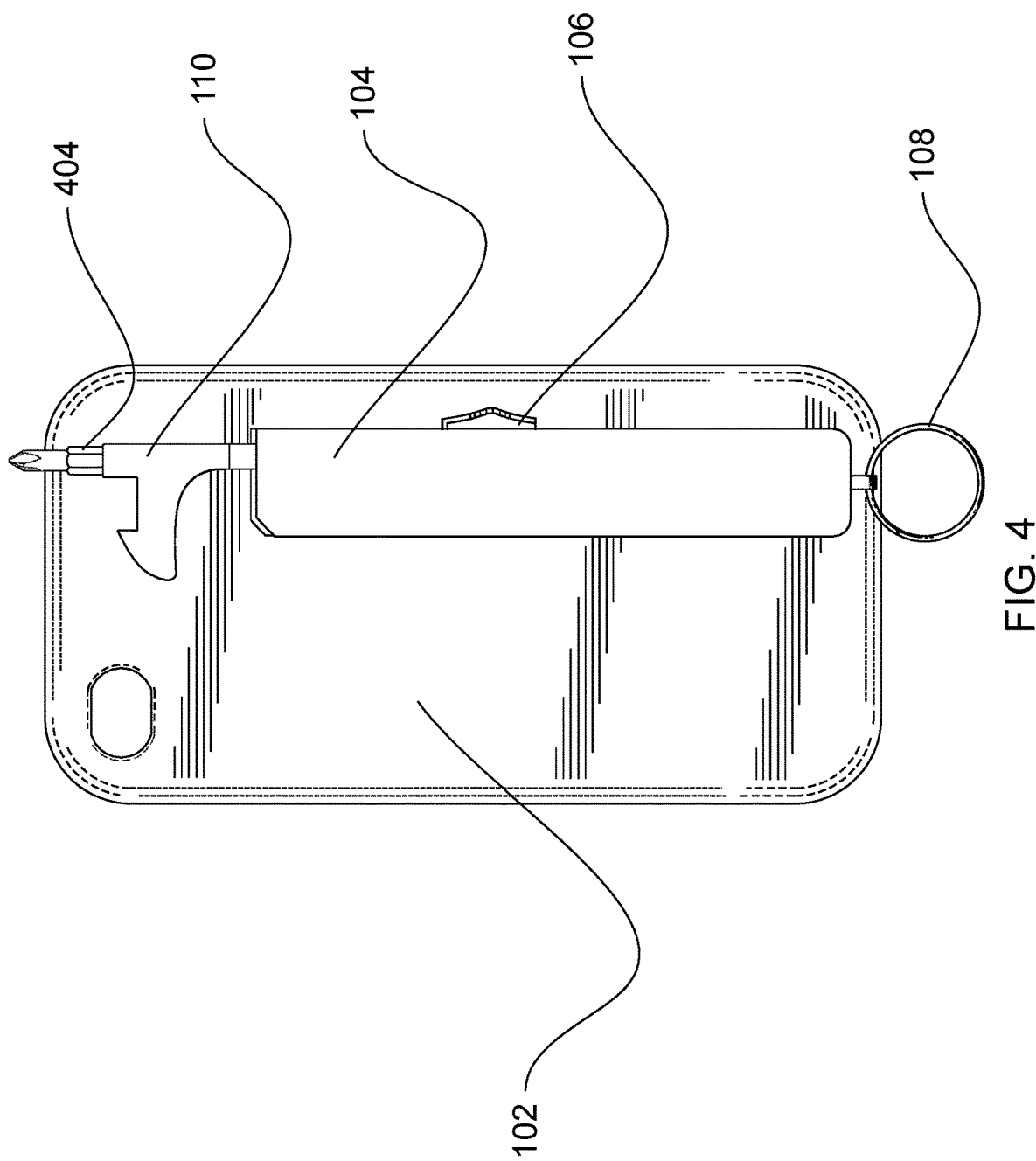
Figure 5:
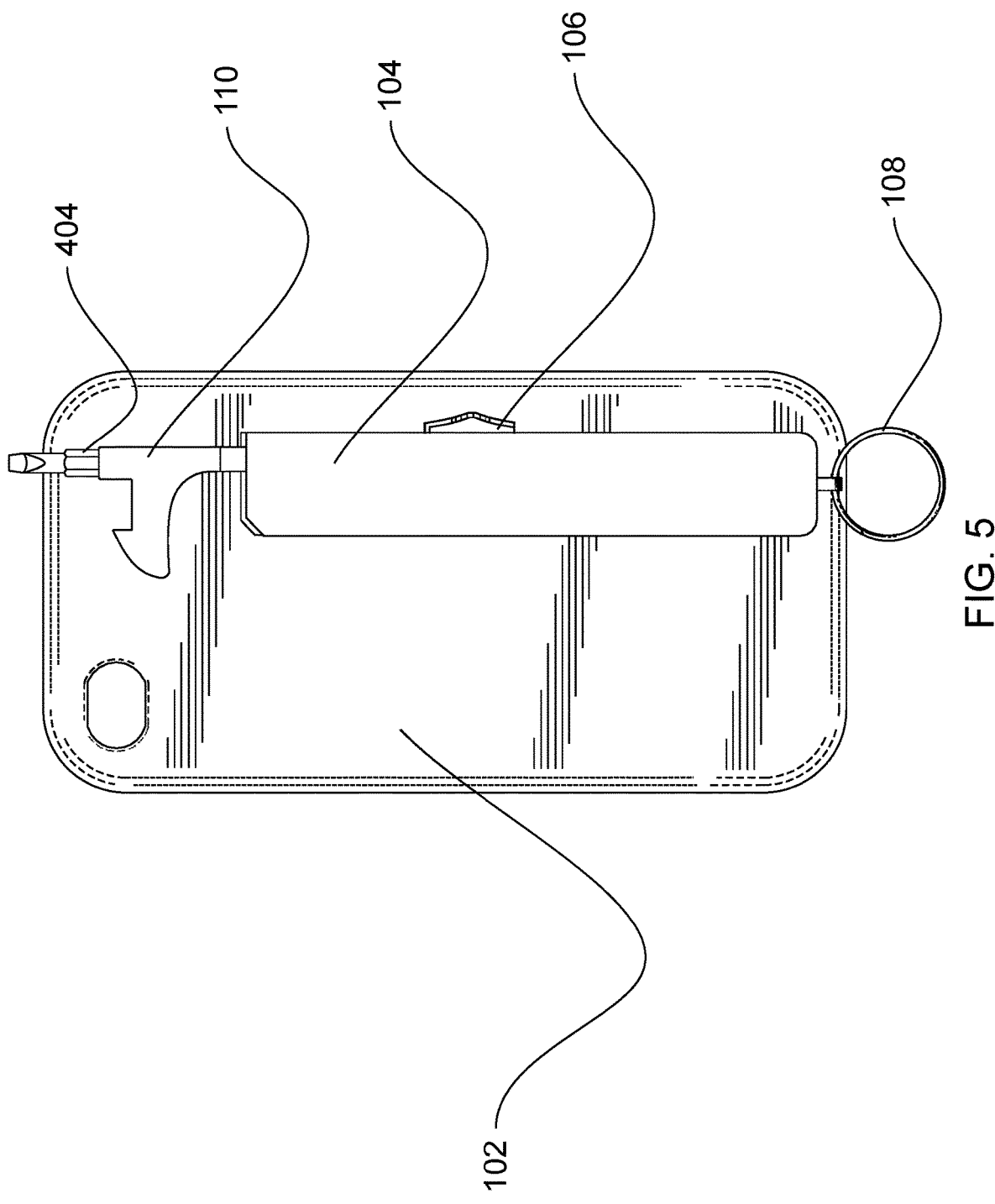
Figure 6:
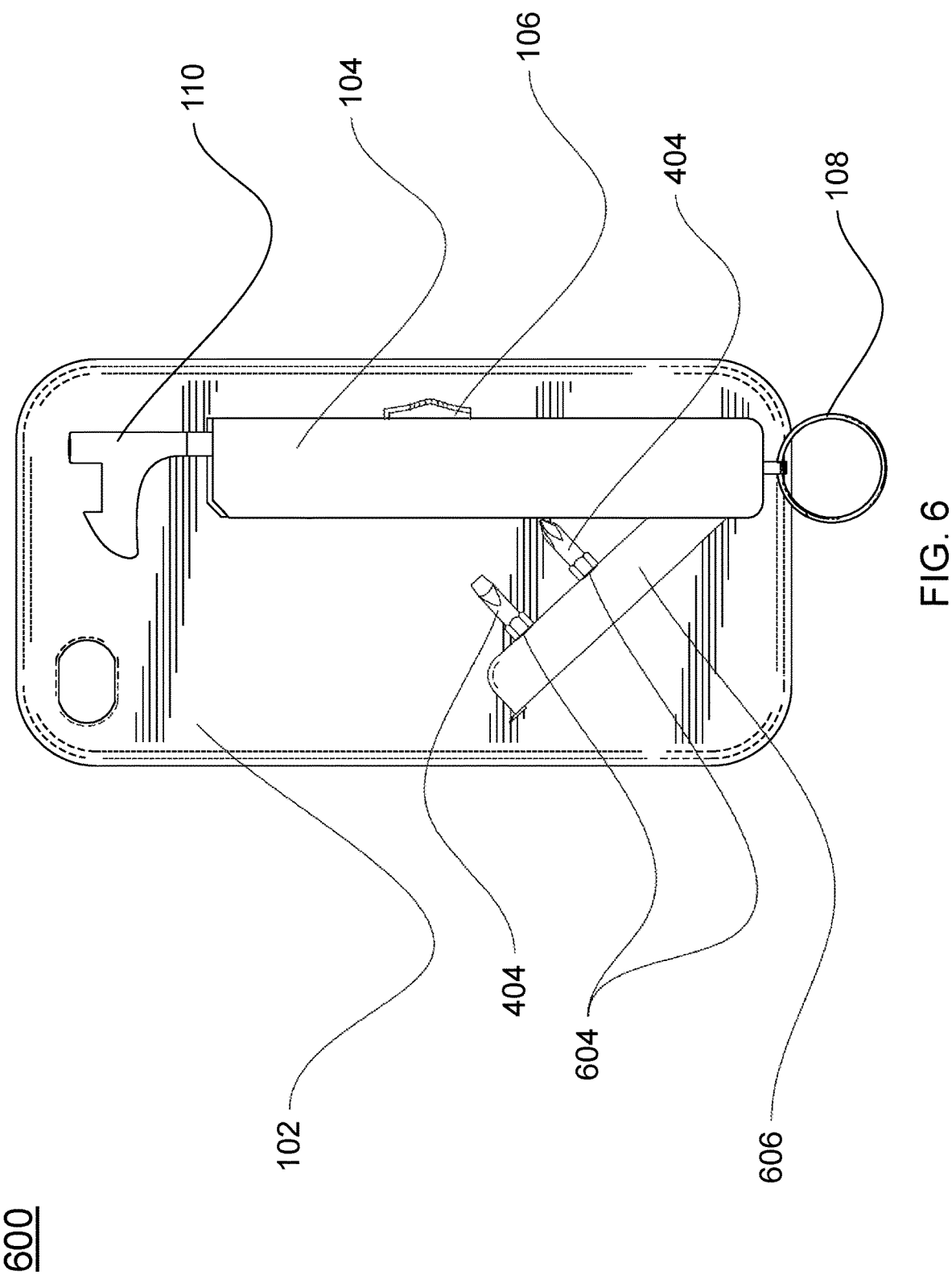
Figure 7:
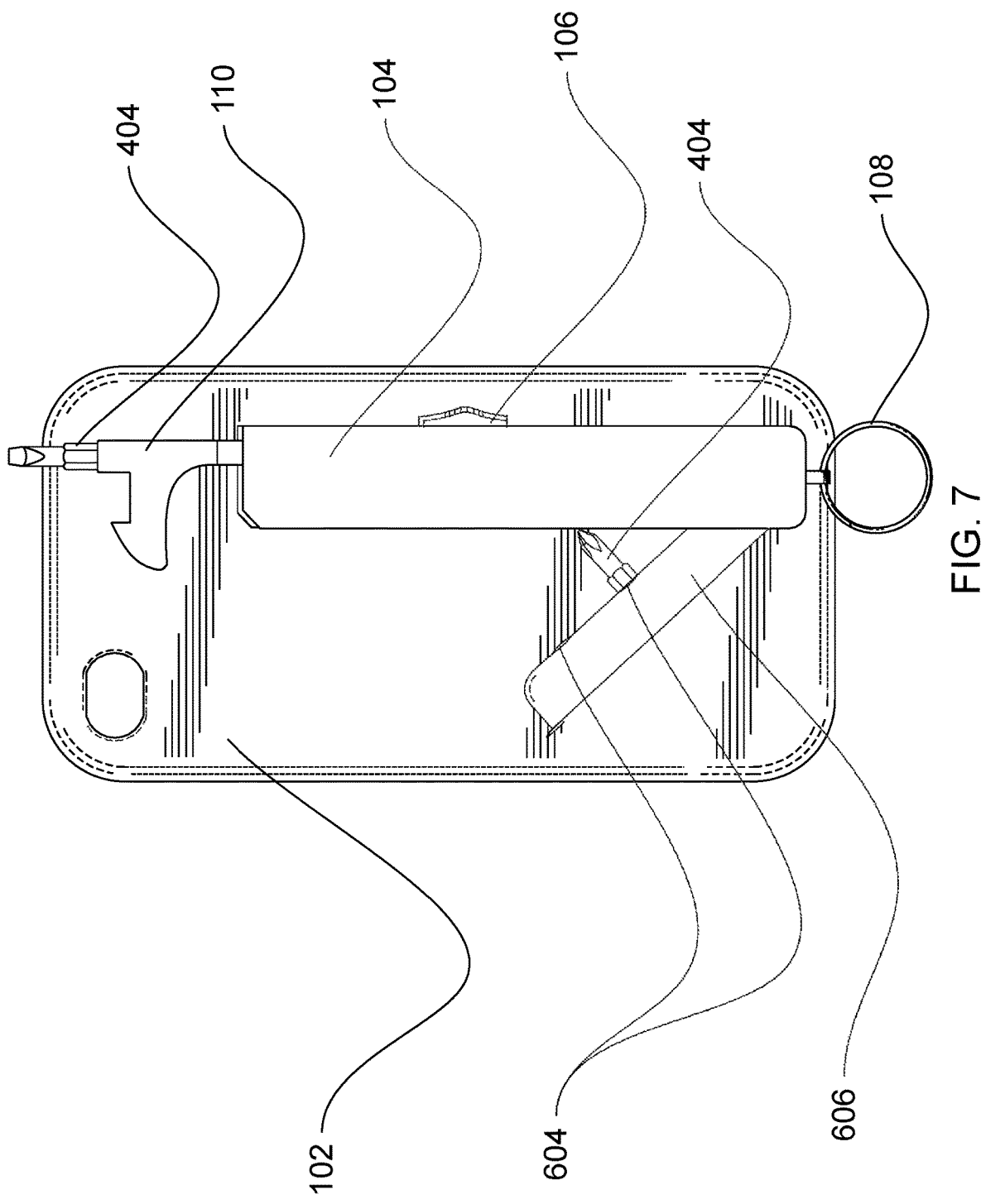
Figure 8:
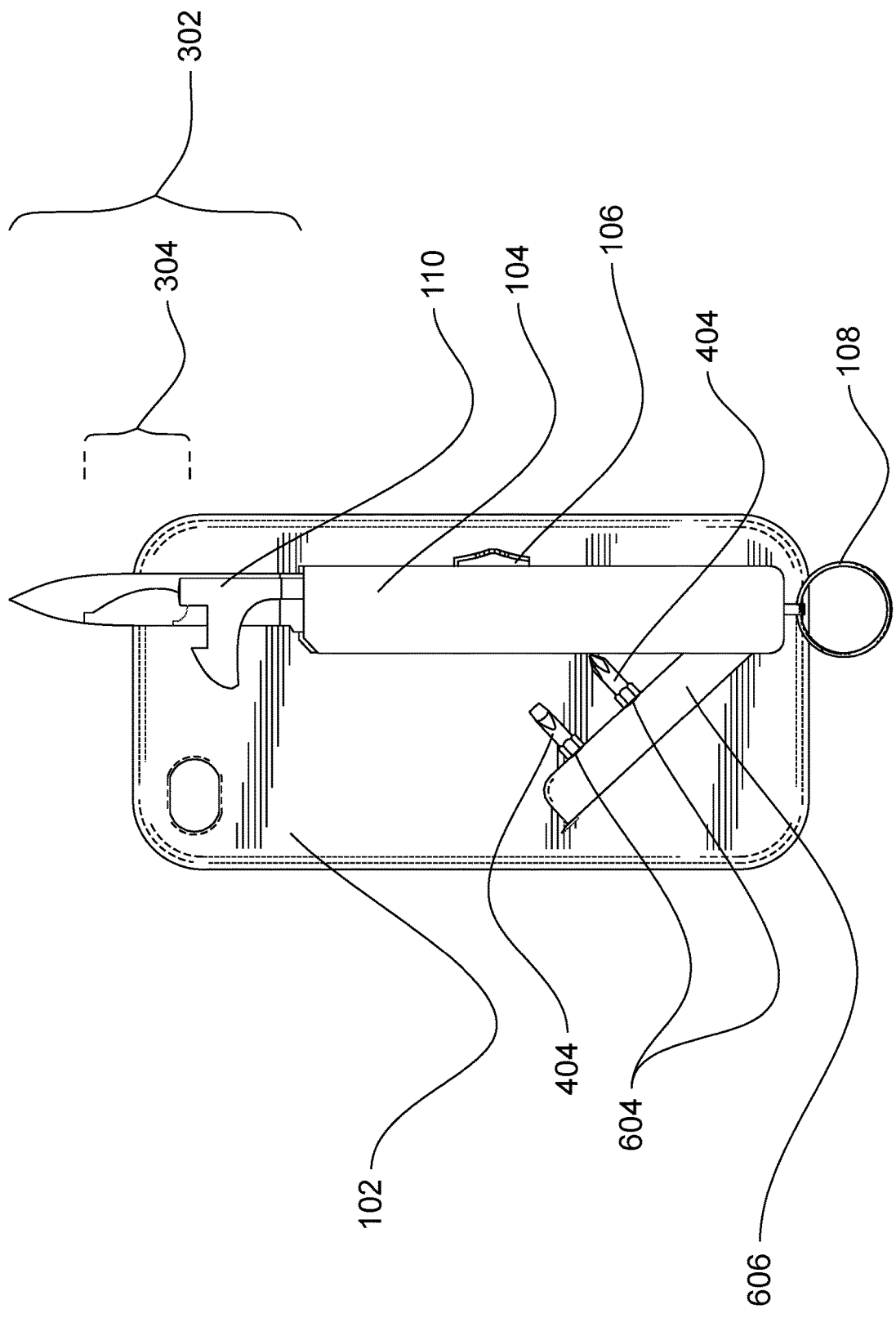
Figure 9:
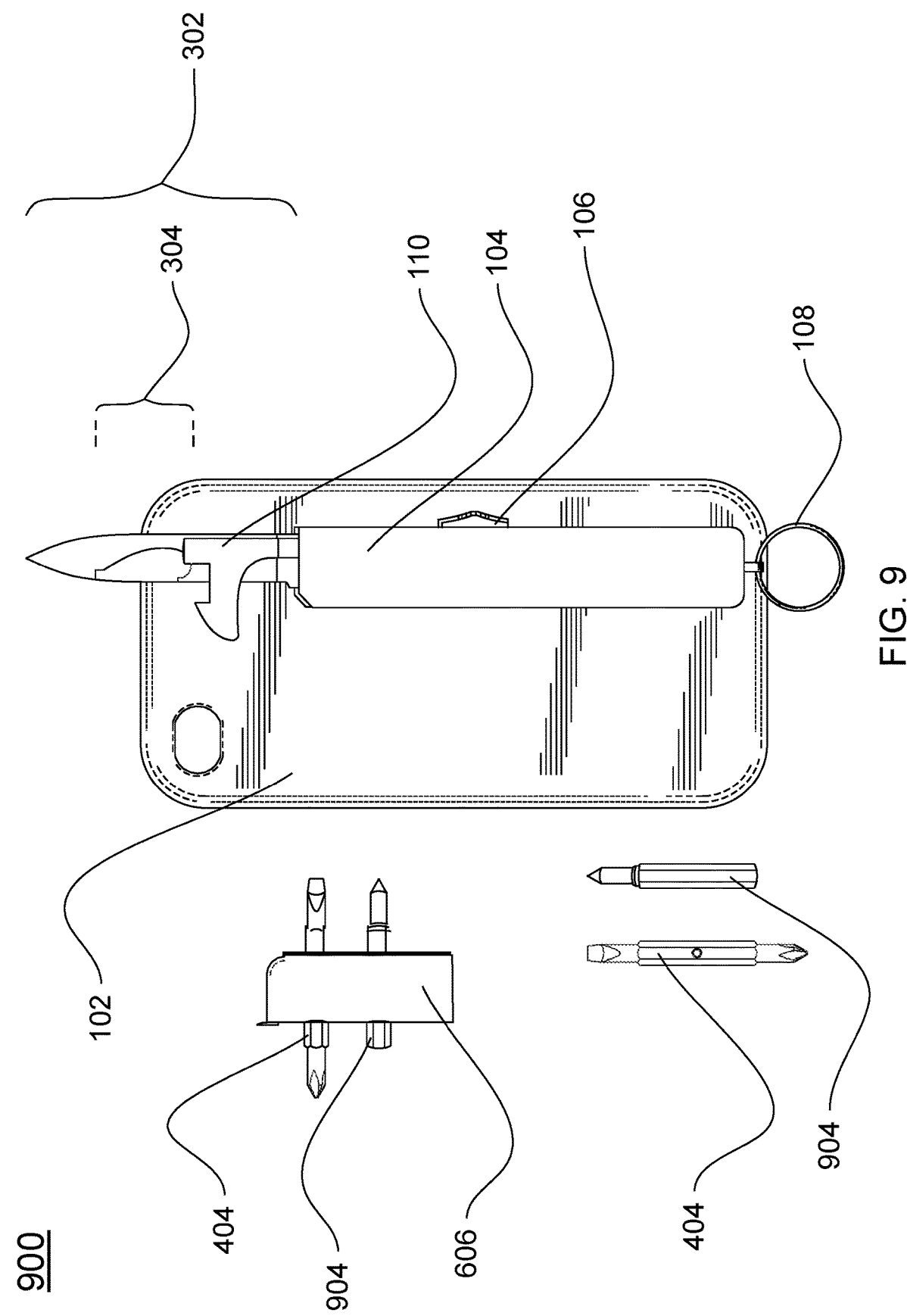

Having thus described the invention in general terms, reference will now be made to the accompanying drawings, which are not necessarily drawn to scale, and wherein:

FIG. 1 illustrates a first view of an apparatus having a holding module attached with a push door opener and a pull door opener collapsed inside a case, in accordance with various embodiment of the present disclosure;

FIG. 2 illustrates a second view of the apparatus having the holding module attached with the push door opener and the pull door opener extending outside the case, in accordance with various embodiment of the present disclosure;

FIG. 3 illustrates a third view of the apparatus having the holding module attached with a bottle opener and a cutter extending outside the case, in accordance with various embodiment of the present disclosure;

FIG. 4 illustrates a fourth view of the apparatus having the holding module attached with the push door opener & the pull door opener and a screw head extending outside the case, in accordance with an embodiment of the present disclosure;

FIG. 5 illustrates a fifth view of the apparatus having the holding module attached with the push door opener & the pull door opener and the screw head extending outside the case, in accordance with another embodiment of the present disclosure;

FIG. 6 illustrates a sixth view of the apparatus having the holding module attached with the push door opener & the pull door opener and the screw head extending outside the case, in accordance with yet another embodiment of the present disclosure;

FIG. 7 illustrates a seventh view of the apparatus having the holding module attached with the push door opener & the pull door opener and the screw head extending outside the case, in accordance with yet another embodiment of the present disclosure;

FIG. 8 illustrates an eighth view of the apparatus having the holding module attached with the push door opener & the pull door opener, the bottle opener, the cutter and the screw head extending outside the case, in accordance with various embodiments of the present disclosure; and FIG. 9 illustrates a ninth view of the apparatus having the holding module attached with a plurality of elements extending outside the case, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a first view 100 of an apparatus having a holding module attached with a push door opener and a pull door opener 110 collapsed inside a case 104, in accordance with various embodiment of the present disclosure. FIG. 2 illustrates a second view 200 of the apparatus having the holding module attached with the push door opener and the pull door opener 110 extending outside the case 104, in accordance with various embodiment of the present disclosure.

Additionally, FIG. 3 illustrates a third view 300 of the apparatus having the holding module attached with a bottle opener 304 and a cutter 302 extending outside the case 104, in accordance with various embodiment of the present disclosure. The apparatus is used for serving one or more purposes. Further, the one or more purposes include but may not be limited to contact less door opening, bottle opening, cutting, screwing or unscrewing, writing, torch lightning, disinfectant dispensing and spoke wrenching. In an embodiment of the present disclosure, the apparatus is used by a user for serving the one or more purposes.

In an example, a user U1 wants to open a door without touching knob or handle. In addition, the user U1 uses the apparatus affixed with a communication device D1 (Let's say Android Smartphone) to open the door. In another example, a user U2 wants to close the door without touching the knob or handle. In addition, the user U2 uses the apparatus affixed with a communication device D2 (Let's say iOS based Smartphone) to close the door. In yet another example, a user U3 wants to write a note in a diary using completely personized pen head. In addition, the user U3 uses the apparatus affixed with a communication device D3 (Let's say Kosher Phone) to write the note. In yet another example, a user U4 wants to tighten screws of an official desk. In addition, the user U4 uses the apparatus affixed with a communication device D4 (Let's say a tablet) to tighten the screws.

The apparatus includes the case 104, a holder 108, and an operating module 106. The above stated elements of the apparatus operate coherently and synchronously to enable the apparatus to serve the one or more purposes. In addition, the case 104 has at least one coupling provision from a plurality of coupling provisions. Further, the case 104 is made of a first material. Furthermore, the first material is selected from a first group of materials including thermoplastic polyurethane, polycarbonate, acrylonitrile butadiene styrene, polyvinyl chloride, polypropylene, plastic, rubber, metallic materials, alloys, composites, nylon, silicon, and wood. In an embodiment of the present disclosure, the case 104 is made of the thermoplastic polyurethane. In another embodiment of the present disclosure, the case 104 is made of any suitable material.

In an example, the the case 104 of the apparatus is made of the polycarbonate. In another example, the the case 104 of the apparatus is made of the acrylonitrile butadiene styrene. In yet another example, the the case 104 of the apparatus is made of the polyvinyl chloride. In yet another example, the the case 104 of the apparatus is made of the polypropylene. In yet another example, the the case 104 of the apparatus is made of the natural rubber. In yet another example, the the case 104 of the apparatus is made of the synthetic rubber. In yet another example, the the case 104 of the apparatus is made of the silicon.

The apparatus is attached or affixed on back of a communication device through the case 104 using the at least one coupling provision from the plurality of coupling provisions. The case 104 is extremely flexible, durable and smooth to touch due to usage of the first material. In an embodiment of the present disclosure, the case 104 is affixed or attached to a back cover 102 of the communication device. In another embodiment of the present disclosure, the case 104 is directly affixed or attached to the back of the communication device.

The plurality of coupling provisions includes but may not be limited to one or more mechanical fasteners, one or more chemical adhesives, and one or more tapes. In an example, the case 104 is affixed or attached to the back cover 102 of a communication device D1 (Let's say an iPhone) using the one or more mechanical fasteners (Let's say nuts and bolts). In another example, the case 104 is affixed or attached to the back cover 102 of a communication device D2 (Let's say smartphone) using the one or more mechanical fasteners (Let's say screws). In yet another example, the case 104 is affixed or attached to the back cover 102 of a communication device D3 (Let's say Palmtop) using the one or more mechanical fasteners (Let's say pins and rivets). In yet another example, the case 104 is affixed or attached to the back cover 102 of a communication device D4 (Let's say Tablet) using the one or more chemical adhesives (Let's say Epoxy adhesives).

In yet another example, the case 104 is directly affixed or attached to the back of a communication device D5 (Let's say an iPhone) using the one or more mechanical fasteners (Let's say nuts and bolts). In yet another example, the case 104 is directly affixed or attached to the back of a communication device D6 (Let's say smartphone) using the one or more mechanical fasteners (Let's say screws). In yet another example, the case 104 is directly affixed or attached to the back of a communication device D7 (Let's say Palmtop) using the one or more mechanical fasteners (Let's say pins and rivets). In yet another example, the case 104 is directly affixed or attached to the back of a communication device D8 (Let's say Tablet) using the one or more chemical adhesives (Let's say Epoxy adhesives). In yet another example, the case 104 is directly affixed or attached to the back of a communication device D9 using the one or more tapes (Let's say Velcro tapes). In yet another example, the case 104 is affixed or attached to the back cover 102 of a communication device D10 (Let's say Note) using the one or more chemical adhesives (Let's say polyurethane).

The apparatus includes the holder 108. The holder 108 is operably coupled at one end of the case 104. In addition, the holder 108 is used for holding at least one of a keychain, a ring, a band, and a bracelet. Further, the holder 108 is made of a second material. Furthermore, the second material is selected from a second group of materials including acrylonitrile butadiene styrene, canvas, fabric, Leather, plastic, rubber, metallic materials, alloys, composites, nylon, silicon, wood and the like.

In an example, the holder 108 is used by the user for holding the keychain at the back of a communication device D1 (Let's say an iPhone). In addition, the holder 108 is made of the acrylonitrile butadiene styrene. In another example, the holder 108 is used by the user for holding the ring at the back of a communication device D2 (Let's say smartphone). In addition, the holder 108 is made of the canvas. In yet another example, the holder 108 is used by the user for holding the band at the back of a communication device D3 (Let's say Palmtop). In addition, the holder 108 is made of the fabric. In yet another example, the holder 108 is used by the user for holding the bracelet at the back of a communication device D4 (Let's say tablet). In addition, the holder 108 is made of the leather.

In an embodiment of the present disclosure, the apparatus may include a band (Not shown in FIGURES) operably connected with the case 104. In another embodiment of the present disclosure, the apparatus may not include the band (Not shown in FIGURES) operably connected with the case 104. The band is placed for holding at least one of the communication device or a hand of the user. Additionally, the band is made of a third material. Further, the third material is any suitable elastic material used for band of the apparatus.

The apparatus includes the operating module 106. The operating module 106 operably coupled with a mechanism that is positioned inside or around the case 104 to control and operate a holding module. Additionally, the operating module 106 is positioned on any of face of the case 104. Further, the holding module has a provision for mounting a plurality of elements for serving the one or more purposes. Furthermore, the plurality of elements includes at least one or combination of the push door opener & the pull door opener 110, a bottle opener 304, the cutter 302, a spoke wrench, a torch, a lighter, a pen head 904, a screw head 404 and a disinfectant dispensing nozzle. Moreover, the one or more purposes include but may not be limited to contact less door opening, bottle opening, cutting, screwing or unscrewing, writing, torch lightning, disinfectant dispensing and spoke wrenching.

The apparatus includes a set of sensors (Not Shown in FIGURES) operably coupled with the mechanism of the operating module 106. In addition, the set of sensors enables automatic operation of the mechanism of the operating module 106. Further, the set of sensors include but may not be limited to one or more image sensors, one or more thermal sensors, one or more proximity sensors, one or more temperature sensors, and one or more microphones.

The apparatus includes one or more housings. The one or more housings holds at least one of a credit card, a debit card, a visiting car, a earbud, and a stand or a leaning module for the communication device. Additionally, the one or more housings are inside or around the case 104 of the apparatus. Further, the apparatus includes a processor and a memory coupled with the set of sensors. Furthermore, the memory includes instructions configured to cause the processor for automatically serving the one or more purposes. Moreover, the set of sensors and the processor are located inside or around the base 104 of the apparatus.

The apparatus is characterized by a length, a breadth and a thickness. In an example, the apparatus has the length of about 80 millimeters. In another example, the length of the apparatus may vary. In an example, the apparatus has the breadth of about 15 millimeters. In another example, the breadth of the apparatus may vary. In an example, the apparatus has the thickness of about 9 millimeters. In another example, the thickness of the apparatus may vary. The apparatus may include a container positioned inside or around the case 104. The container consists disinfectant fluid that may be dispensed through the disinfectant dispensing nozzle.

The operating module 106 controls and operates the holding module using the mechanism that is positioned inside or around the case 104. In addition, the operating module 106 is at least one of a manual operating module, a semi-automatic operating module and an automatic operating module. Further, the plurality of elements is mounted or attached to the holding module automatically or semi-automatically or manually by the user.

In an example, the apparatus automatically opens the holding module having the push door opener & the pull door opener 110 when the one or more image sensors detects the user is approaching the door. In another example, the apparatus automatically opens the holding module having the screw head 404 when the one or more image sensors detects the user is trying to screw or unscrew. In yet another example, the apparatus automatically opens the holding module having the disinfectant dispensing nozzle when the one or more microphones detect voice command of the user (For Example, "I want to sanitize hands"). In yet another example, the apparatus automatically opens the holding module having the pen head 904 when the one or more cameras detect the user is approaching a Notebook.

In yet another example, the user manually opens the holding module of the apparatus having the push door opener & the pull door opener 110 when the user has to open the door. In yet another example, the user manually opens the holding module of the apparatus having the screw head 404 when the user has to screw or unscrew. In yet another example, the user manually opens the holding module of the apparatus having the disinfectant dispensing nozzle when the user has to disinfect. In yet another example, the user manually opens the holding module of the apparatus having the pen head 904 when the user has to write.

In an embodiment of the present disclosure, the user may mount and change the plurality of elements manually on the holding module of the apparatus. In another embodiment of the present disclosure, each of the plurality of elements is already mounted on corresponding holding module of the apparatus. In yet another embodiment of the present disclosure, each of the plurality of elements has to be mounted and replaced on single holding module of the apparatus. In yet another embodiment of the present disclosure, the apparatus has multiple holding modules.

FIG. 4 illustrates a fourth view 400 of the apparatus having the holding module attached with the push door opener & the pull door opener 110 and the screw head 404 extending outside the case 104, in accordance with an embodiment of the present disclosure. In the fourth view 400, the screw head 404 is a Philips screw head. In an example, the Philips screw head is manually attached to the holding module using a magnetic coupling. In another example, the Philips screw head is automatically attached to the holding module based on the detection of the screws through the one or more image sensors. Additionally, the fourth view 400 shows that the holding module also has the push door opener & the pull door opener 110 along with the screw head 404.

FIG. 5 illustrates a fifth view 500 of the apparatus having the holding module attached with the push door opener & the pull door opener 110 and the screw head 404 extending outside the case 104, in accordance with another embodiment of the present disclosure. In the fifth view 500, the screw head 404 is a slotted screw head. Alternatively, the screw head 404 is a hexagonal screw head. Similarly, the screw head 404 may be a torx screw head. In an example, the slotted screw head is manually attached to the holding module using the magnetic coupling. In another example, the slotted screw head is automatically attached to the holding module based on the detection of the screws through the one or more image sensors. Additionally, the fifth view 500 shows that the holding module also has the push door opener & the pull door opener 110 along with the slotted screw head.

FIG. 6 illustrates a sixth view 600 of the apparatus having the holding module attached with the push door opener & the pull door opener 110 and the screw head 404 extending outside the case 104, in accordance with yet another embodiment of the present disclosure. In the sixth view 600, multiple types of the screw head 404 is held inside a secondary holder 606. The secondary holder 606 has a plurality of holes 604 for holding the multiple types of the screw head 404. In an example, the secondary holder 606 is operable coupled with the base 104 through a hinge joint. In another example, the secondary holder 606 is operable coupled with the base 104 through any other suitable joints.

FIG. 7 illustrates a seventh view 700 of the apparatus having the holding module attached with the push door opener & the pull door opener 110 and the screw head 404 extending outside the case 104, in accordance with yet another embodiment of the present disclosure. In the seventh view 700, the apparatus has the slotted screw head attached to the holding module for the one or more purposes. Additionally, the apparatus has the Philips screw head held inside the secondary holder 606.

FIG. 8 illustrates an eighth view 800 of the apparatus having the holding module attached with the push door opener & the pull door opener 110, the bottle opener 304, the cutter 302 and the screw head 404 extending outside the case 104, in accordance with various embodiments of the present disclosure. In the eighth view 800, the apparatus has the push door opener & the pull door opener 110, the bottle opener 304, the cutter 302 and the screw head 404 extending outside the case 104 at the same time for the one or more purposes. Similarly, FIG. 9 illustrates a ninth view 900 of the apparatus having the holding module attached with the plurality of elements extending outside the case 104, in accordance with various embodiments of the present disclosure.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

I claim:
1. An apparatus for serving one or more purposes, the apparatus comprising:

a case, wherein the case has at least one coupling provision from a plurality of coupling provisions, wherein the case is made of a first material;

a holder operably coupled at one end of the case, wherein the holder is used for holding at least one of a keychain, a ring, and a bracelet, wherein the holder is made of a second material; and an operating module operably coupled with a mechanism that is positioned inside or around the case to control and operate a holding module, wherein the operating module is positioned on any of face of the case, wherein the holding module has a provision for mounting a plurality of elements for serving the one or more purposes, wherein the one or more purposes comprise contact less door opening, bottle opening, cutting, screwing or unscrewing, writing, torch lightning, disinfectant dispensing and spoke wrenching.

2. The apparatus as recited in claim 1, further comprising a set of sensors operably coupled with the mechanism of the operating module, wherein the set of sensors enables automatic operation of the mechanism of the operating module, wherein the set of sensors comprising one or more image sensors, one or more thermal sensors, one or more proximity sensors, one or more temperature sensors, and one or more microphones.

3. The apparatus as recited in claim 1, further comprising one or more housings for holding at least one of a credit card, a debit card, a visiting car, a earbud, and a stand or a leaning module for a communication device, wherein the one or more housings are inside or around the case of the apparatus.

4. The apparatus as recited in claim 1, wherein the plurality of elements comprising at least one or combination of a push door opener, a pull door opener, a bottle opener, a cutter, a spoke wrench, a torch, a lighter, a pen, a screw head and a disinfectant dispensing nozzle.

5. The apparatus as recited in claim 1, wherein the first material is selected from a first group of materials comprising thermoplastic polyurethane, polycarbonate, acrylonitrile butadiene styrene, polyvinyl chloride, polypropylene, plastic, rubber, metallic materials, alloys, composites, nylon, silicon, and wood.

6. The apparatus as recited in claim 1, wherein the second material is selected from a second group of materials comprising acrylonitrile butadiene styrene, canvas, fabric, Leather, plastic, rubber, metallic materials, alloys, composites, nylon, silicon, and wood.

7. The apparatus as recited in claim 1, further comprising a processor and a memory coupled with the set of sensors, wherein the memory comprises instructions configured to cause the processor for automatically serving the one or more purposes, wherein the set of sensors and the processor are located inside or around the base of the apparatus.

8. The apparatus as recited in claim 1, the operating module controls and operates the holding module using the mechanism that is positioned inside or around the case, wherein the operating module is at least one of a manual operating module, a semi-automatic operating module and an automatic operating module.

9. The apparatus as recited in claim 1, wherein the plurality of elements is mounted or attached to the holding module automatically or semi-automatically or manually by a user.

10. The apparatus as recited in claim 1, further comprising a band operably connected with the case, wherein the band is placed for holding at least one of a communication device or a hand of a user, wherein the band is made of a third material.

* * * * *